(12) United States Patent
Tazaki et al.

(10) Patent No.: US 6,502,403 B1
(45) Date of Patent: Jan. 7, 2003

(54) STEAM-INJECTION TYPE GAS TURBINE

(75) Inventors: Masamoto Tazaki, Tokyo-To (JP);
Takao Sugimoto, Hyogo-Ken (JP);
Koji Sambonsugi, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/824,757

(22) Filed: Apr. 4, 2001

(30) Foreign Application Priority Data

Apr. 5, 2000 (JP) ........................................ 2000-103971

(51) Int. Cl.7 ................................. F02C 3/30; F02C 7/16
(52) U.S. Cl. ........................ 60/784; 60/39.54; 60/39.55; 60/806
(58) Field of Search .................... 60/39.784, 39.182, 60/39.3, 32.54, 39.55, 806

(56) References Cited

U.S. PATENT DOCUMENTS

| | | | |
|---|---|---|---|
| 5,170,622 A | * 12/1992 | Cheng | 60/39.55 |
| 5,579,631 A | * 12/1996 | Chen et al. | 60/39.3 |
| 5,613,356 A | * 3/1997 | Frutschi | 60/39.182 |
| 6,293,086 B1 | * 9/2001 | Reynolds | 60/39.55 |
| 6,293,088 B1 | * 9/2001 | Moore et al. | 60/39.3 |

FOREIGN PATENT DOCUMENTS

| JP | A 3-96628 | 4/1991 |
|---|---|---|
| JP | A 6-108877 | 4/1994 |

* cited by examiner

*Primary Examiner*—Louis J. Casaregola
(74) *Attorney, Agent, or Firm*—Oliff & Berridge, PLC

(57) ABSTRACT

A steam-injection type gas turbine system provided with a waste-heat boiler uses surplus steam effectively for cooling the stationary blades of a turbine. The steam-injection type gas turbine system includes an air compressor (2) for compressing air, a combustor (3) for mixing a fuel with compressed air to burn the fuel, a turbine (4) driven by the energy of a combustion gas produced by the combustor (3), a waste-heat boiler (10) using an exhaust gas (G) discharged from the turbine (4) as a heat source, a steam supply system (23) for distributing steam generated by the waste-heat boiler (10) to the combustor (3), the stationary blades (68B) of the turbine (4) and external steam loads (22), and a steam distribution adjusting means (32) for preferentially supplying steam to the external steam loads (22), adjusting the rate of supply of steam to the combustor (3) and supplying the rest of the steam to the stationary blades (68B).

9 Claims, 7 Drawing Sheets

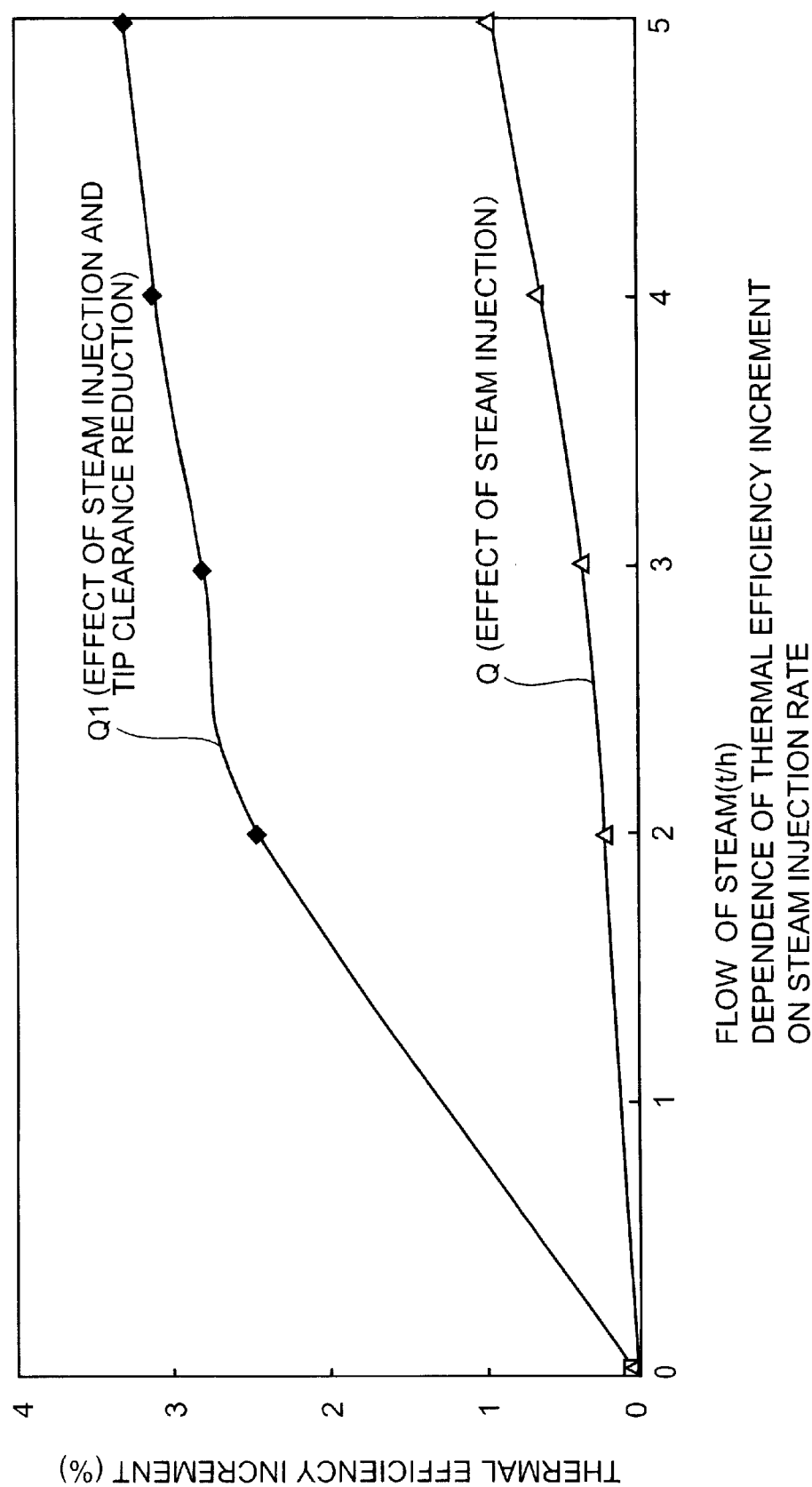

STEAM-INJECTION TYPE GAS TURBINE

BACKGROUND OF THE INVENTION

1. Field of the Invention

The present invention relates to a steam-injection type gas turbine system including a steam-injection type gas turbine and a waste heat boiler, in which steam generated by the waste heat boiler is injected into a combustor to increase the output, and is supplied to the stationary blades of the gas turbine to cool the stationary blades.

2. Description of the Related Art

A cogeneration system disclosed in, for example, JP-A No. Hei 6-108877 uses power generated by a gas turbine for power generation, recovers waste heat from the gas turbine and uses the recovered waste heat for covering heat demand, such as air conditioning and hot-water supply. The cogeneration system converts the energy of a single energy source, such as a fuel gas, into effective electrical and thermal energies. Since the temperature of the exhaust gas for raising the inlet temperature of the turbine from another turbine is raised to enhance the output of the turbine, the heat-electric ratio, i.e., the ratio between the thermal energy of the exhaust gas and generated power, increases. Consequently, it occurs sometimes that an amount of steam exceeding an amount of steam necessary for use as process steam by various steam loads is generated when the heat of the exhaust gas discharged from the gas turbine is recovered by a waste heat boiler or the like. Surplus part of steam generated by using recovered waste heat, remaining after the steam is used for thermal demand is injected into combustor for a gas turbine to enhance the output of the gas turbine and to improve the thermal efficiency of the same by reducing the combustion temperature of the combustor by the injected steam and increasing fuel supply rate.

The gas turbine converts the energy, i.e., heat and pressure, of a high-pressure, high-velocity combustion gas jetted by the combustor into kinetic energy to deliver its mechanical output through a rotating shaft. Therefore the stationary blades fixed to the casing of a gas turbine and forming gas-turbine nozzles are exposed directly to the high-temperature combustion gas and hence the stationary blades must be cooled. The conventional gas turbine cools its stationary blades with compressed air supplied by a compressor that supplies compressed air to a combustor. Consequently, the amount of the compressed air supplied to the combustor decreases, the output of the gas turbine decreases accordingly, and the thermal efficiency of the gas turbine decreases.

Incomplete combustion occurs in the combustor if steam is injected into the combustor at an injection rate exceeding a predetermined level. Accordingly, the surplus exhaust gas that does not need to be supplied to the waste-heat boiler or the surplus steam left after using steam for thermal purposes is discharged into the atmosphere. Although the cogeneration system is intended for the effective use of the heat of the exhaust gas of a gas turbine, the cogeneration system wastes the exhaust gas or the steam generated by using the heat of the exhaust gas, which reduces the overall thermal efficiency of the cogeneration system.

A gas turbine proposed in JP-A No. Hei 3-96628 uses steam for cooling its turbine nozzles to avoid the reduction of the output of the gas turbine due to the use of compressed air for cooling the stationary blades thereof. This known gas turbine supplies the steam used for cooling the stationary blades to a combustor. Consequently, it is possible that incomplete combustion occurs in the combustor if the cooling steam is supplied to the combustor at an excessively high rate. Thus part of the steam used for cooling the stationary blades must be unavoidably discharged outside, which reduces the overall thermal efficiency of the cogeneration system.

SUMMARY OF THE INVENTION

Accordingly, it is an object of the present invention to use surplus steam effectively and to cool the stationary blades of a turbine without entailing the reduction of the output and thermal efficiency of the gas turbine.

To achieve the object, the present invention provides a steam-injection type gas turbine system including an air compressor, a combustor for mixing a fuel with compressed air to burn the fuel, a turbine driven by energy of a combustion gas produced by the combustor, a waste-heat boiler using an exhaust gas discharged from the turbine as a heat source, a steam supply system for distributing steam generated by the waste-heat boiler to the combustor, stationary blades of the turbine and external steam loads, and a steam distribution adjusting means for preferentially supplying steam to the external steam loads, adjusting rate of supply of steam to the combustor and supplying the rest of the steam to the stationary blades so that the steam leaving the stationary blades are mixed in a main gas flow below the combustor. The term "main gas flow" signifies the combustion gas discharged from the combustor and serving as an energy source for driving the turbine.

In the gas turbine system, the steam generated by supplying the exhaust gas discharged from the turbine to the waste-heat boiler is supplied preferentially to the external steam load, the steam is supplied to the combustor so that incomplete combustion may not occur in the combustor, and the rest of the steam is supplied to the stationary blades of the turbine to cool the stationary blades. Thus, all the generated steam can be effectively used, compressed air does not need to be used continuously for cooling the stationary blades of the turbine and hence the output and thermal efficiency of the gas turbine system are maintained high. The steam used for cooling the stationary blades of the turbine is not injected into the combustor, there is no possibility that incomplete combustion occurs in the combustor due to the supply of an excessive amount of steam into the combustor.

Preferably, each of the stationary blades of the turbine is provided with a cooling passage, and steam supplied to the stationary blades flow through the stationary blades and flow from the trailing edges of the stationary blades into the main gas flow. The steam supplied to the turbine flows through the cooling passages formed in the stationary blades efficiently cooling the stationary blades and flows from the trailing edges of the stationary blades into the main gas flow. Thus, the steam supplied to the turbine does not flow through throats between the adjacent stationary blades. Therefore the flow of the gas flowing through the throats is affected scarcely by the flow of the steam. Accordingly, the reduction of the efficiency due to the mismatched operation of the compressor and the turbine does not occur even if the flow of the steam supplied to the stationary blades of the turbine varies.

Preferably, the stationary blades of the gas turbine system to which steam is supplied are the first-stage or the second-stage nozzle blades. When steam is supplied to the first-stage nozzle blades, the thermal energy of the steam can be recovered at a very high efficiency. When the steam that has cooled the first-stage nozzle blades is discharged into the main gas flow, the steam flows through the throats between the adjacent second-stage nozzle blades. Since the flow of the steam that flows through the turbine is dependent on the sectional area of the throats, the adverse effect of the flow of the steam into the main gas flow is insignificant. When steam is supplied to the second-stage nozzle blades, thermal energy recovery percentage is slightly smaller than that at which the thermal energy of steam can be recovered when the steam is supplied to the first-stage nozzle blades, but the excessive increase of thermal load on the turbine can be avoided.

The gas turbine system according to the present invention may include further an air supply means that extracts high-pressure air from the compressor and supplies the same to the stationary blades of the turbine, and a steam/air selecting means that supplies the high-pressure air to the stationary blades when the rate of supply of steam to the stationary blades decreases.

The stationary blades of the turbine can be always effectively cooled because a reduction in steam injection rate at which steam is injected into the turbine to cool the stationary blades of the turbine is supplemented by supplying high-pressure air to the stationary blades.

Preferably, a turbine casing surrounding the stationary blades and the rotor blades of the turbine, and a main housing surrounding the turbine casing form an internal steam passage through which steam is supplied to the stationary blades of the turbine, and the turbine casing is cooled by steam that flows through the internal steam passage. Since the turbine casing is thus cooled, the tip clearance, i.e., the gap between the tip of the rotor blade and the turbine casing, may be small, so that the leakage loss of the combustion gas is small, the adiabatic efficiency of the turbine is high and the thermal efficiency of the gas turbine is high.

The steam supply system of the gas turbine system may include a $NO_x$ reducing steam jetting nozzle and an output enhancing steam jetting nozzle placed in the combustor. Steam jetted through the $NO_x$ reducing steam jetting nozzle reduces combustion temperature of the combustor to reduce $NO_x$ and steam jetted through the output enhancing steam jetting nozzle reduces the combustion temperature to enable fuel supply rate to be increased. Thus, $NO_x$ can be reduced and the output and the thermal efficiency of the turbine can be increased.

The gas turbine system may further include air adjusting mechanisms for adjusting the setting angle of the stationary blades of the compressor to adjust air flow at which air flows into the compressor, and an air control means for controlling the air adjusting mechanisms to decrease air flow according to increase in steam flow at which steam is supplied to the combustor.

The air control means monitors steam injection rate at which steam is injected into the combustor at all times and controls the air adjusting mechanisms according to steam injection rate. The air adjusting mechanisms adjust the setting angle of the movable stationary blades of the axial flow compressor to decrease air flow at which air flows into the compressor according to increase in steam injection rate. Thus, the flow of the combustion gas flowing into the turbine can be kept substantially constant irrespective of the variation of steam injection rate. Consequently, excessive increase in the pressure in the rotor chamber can be prevented, the reduction of durability of the gas turbine can be prevented, surging can be prevented, stable operation can be ensured, the reduction of the adiabatic efficiencies of the compressor and the turbine can be prevented, and the thermal efficiency of the gas turbine can be maintained on a high level. The operation of the gas turbine is moderated on the basis of a rated point corresponding to a state where steam injection rate is zero. Thus, the gas turbine system is able to operate at an efficiency at which ordinary gas turbine systems operate when steam injection rate is zero.

BRIEF DESCRIPTION OF THE DRAWINGS

FIG. 8 is a graph showing the dependence of the thermal efficiency of the turbine on steam injection.

DESCRIPTION OF THE PREFERRED EMBODIMENTS

Figure 1:
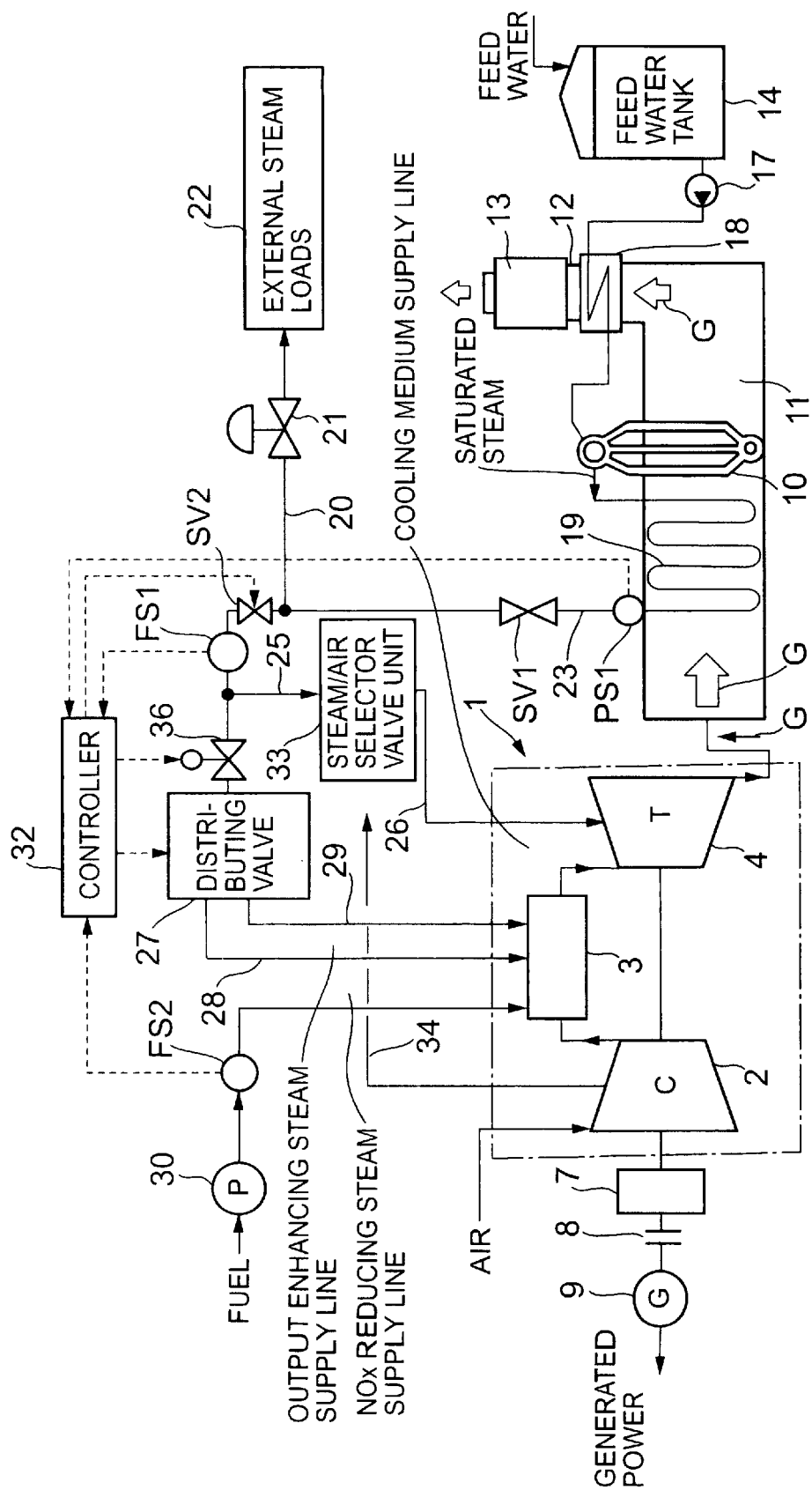
FIG. 1 is a block diagram of a steam-injection type gas turbine system in a preferred embodiment according to the present invention.

A steam-injection type gas turbine system in a preferred embodiment according to the present invention will be described hereinafter with reference to the accompanying drawings. FIG. 1 is a block diagram of a steam-injection type gas turbine system in a preferred embodiment according to the present invention.

Referring to FIG. 1, a gas turbine 1 includes a compressor 2, a combustor 3 and a turbine 4. The compressor compresses air and supplies compressed air to the combustor. A fuel gas, such as a city gas, is injected into the combustor 3 for combustion. The turbine 4 is driven by the energy of a high-temperature, high-pressure combustion gas produced by combustion in the combustor 3. The turbine 4 drives the compressor 2 and drives a power generator 9 through a reduction gear 7 and a coupling 8. Power generated by the power generator 9 is distributed to various power loads.

All of an exhaust gas G discharged form the turbine 4 is supplied to a waste-heat boiler 10 and is discharged into the atmosphere through a discharge passage 11, a stack 12 and a silencer 13. An economizer 18 disposed in the stack 12 and using the heat of the exhaust gas G preheats feed water pumped from a feed water tank 14 by a feed water pump 17. The waste-heat boiler 10 makes the preheated feed water exchange heat with the exhaust gas G; that is, the waste-heat boiler 10 recovers heat from the exhaust gas G delivered to the exhaust gas passage 11 and generate saturated steam. A superheater 19 heats the saturated steam to produce superheated steam. The superheated steam is supplied to a steam supply system 23. The superheated steam flows through a shutoff valve SV1 included in the steam supply system 23 into a process steam supply line 20 and is distributed as process steam to various external steam loads 22 including air conditioning systems and hot-water supply systems after its pressure has been adjusted to a predetermined pressure.

The steam-injection type gas turbine system is a cogeneration system. The heat-electric ratio, i.e., the ratio between the thermal energy of the exhaust gas G of a comparatively high temperature and generated power, is considerably high. Therefore, all the exhaust gas G discharged from the gas turbine 1 is delivered to the waste-heat boiler 10 for heat recovery, the steam generated by the waste-heat boiler 10 is superheated by the superheater 19 to generate a large amount of superheated steam of saturated steam. The steam supply system 23 is provided with a pressure gage PS1 to measure the outlet pressure of the superheated steam at the outlet of the superheater 19, and a shutoff valve SV2 placed in an upper part of a steam supply line 24 included in the steam supply system 23. When the pressure of the superheated steam measured by the pressure gage PS1 is higher than a predetermined level, a controller (steam distribution adjusting means) 32 decides that the steam demand of the external steam loads 22 is small and the superheated steam is generated excessively and opens the shutoff valve SV2. Thus, the large amount of steam is supplied preferentially as process steam to the external steam loads 22 to meat the steam demand of the external steam loads 22 and the surplus steam is delivered to the steam supply line 24.

The controller 32 always monitors data provided by a steam flowmeter FS1 for measuring the flow of the steam that flows through the steam supply line 24 and data provided by a fuel flowmeter FS2 that measures the flow of a fuel pumped into the combustor 3 by a fuel pump 30. The controller 32 controls the opening of a flow adjusting valve 36 on the bases of the data provided by the steam flowmeter SF1 and the fuel flowmeter SF2 such that the steam is supplied to a distribution valve 27 at a flow not higher than an upper limit flow at which incomplete combustion does not occur in the combustor 3. A surplus part of the steam delivered to the steam supply line 24 not supplied to the distributing valve 27 flows into a cooling steam supply line 25.

The controller 32 controls the distributing valve 27 to supply the steam to a $NO_x$ reducing steam supply line 28 connected to a $NO_x$ reducing steam jetting nozzle, and an output enhancing steam supply line 29 connected to an output enhancing steam jetting nozzle at a distribution ratio, which will be explained later. Pressure regulating valves, not shown, are placed in the $NO_x$ reducing steam supply line 28 and the output enhancing steam supply line 29, respectively, to adjust the pressure of the steam at a predetermined pressure. These pressure regulating valves supplies the steam to the combustor 3 after reducing the pressure of the steam to a pressure slightly higher than the pressure in the rotor chamber.

The steam delivered to the steam supply line 24 is supplied at a flow adjusted by the distributing valve 27 and not higher than the upper limit value to the combustor 3. All the surplus steam delivered to the cooling steam supply line 25 flows through a steam/air selector valve unit 33 and a cooling medium supply line 26 into the turbine 4 to cool the stationary blades of the turbine 4. A compressed air supply line 34 for supplying high-pressure compressed air discharged from the compressor 2 is connected to the steam/air selector valve unit 33. When the flow of the steam being supplied to the stationary blades decreases, the compressed air is supplied through the cooling medium supply line 26 to the stationary blades.

Figure 2:
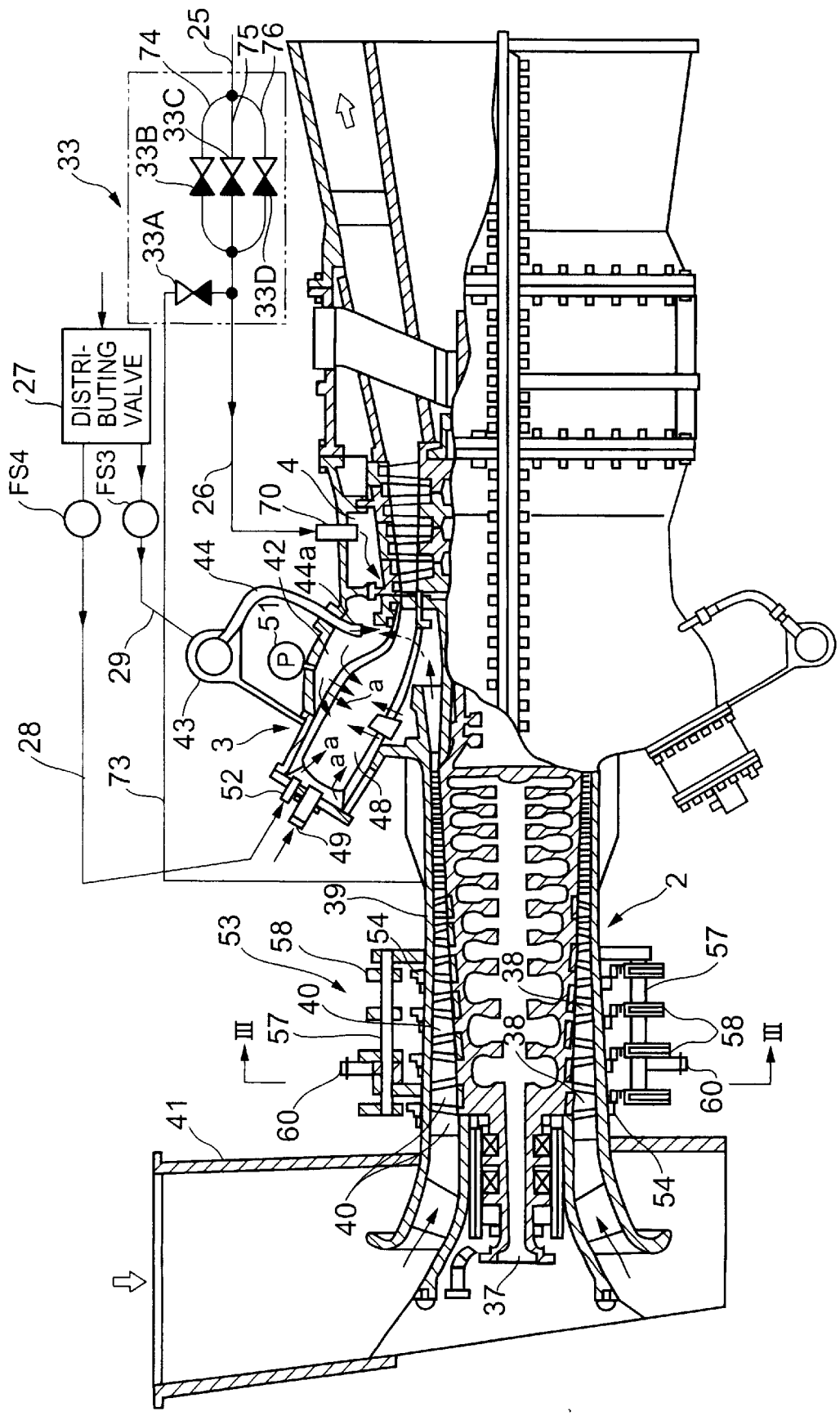
FIG. 2 is a partly cutaway schematic side elevation of a gas turbine included in the steam-injection type gas turbine system shown in FIG. 1.

FIG. 2 is a partly cutaway schematic side elevation of the gas turbine 1. Although the steam-injection type gas turbine 1 shown in FIG. 2 is provided with the axial-flow compressor 2, the present invention is applicable to a steam-injection type gas turbine provided with a centrifugal compressor. The axial-flow compressor 2 has a plurality of compression stages each essentially consisting of rotor blades 38 supported on the outer surface of a rotor shaft 37, and a plurality of stationary blades 40 attached to the inner circumference of a main housing 39, i.e., an outer cover for the gas turbine 1. The axial-flow compressor 2 compresses air sucked through an inlet duct 41 and delivers compressed air into an annular rotor chamber 42. The steam supplied from the waste-heat boiler 10 shown in FIG. 1 flows through an annular steam manifold 43 and an output enhancing steam injection nozzle 44, the steam is injected through a nozzle hole 44*a* formed in an end part of the output enhancing steam injection nozzle 44 into the combustor 3 and is mixed with the compressed air to produce a mixture. The mixture is supplied into the combustor 3.

A plurality of combustors 3, (six combustors 3 in this embodiment) are arranged around the annular rotor chamber 42 at angular intervals. The mixture of the steam and the compressed air produced in the rotor chamber 42 is guided into a combustion chamber 48 as indicated by the arrows a. The fuel injection nozzle 49 injects the fuel into the combustion chamber 48 of the combustor 3. The fuel and the compressed air are mixed in the combustion chamber 48 and the fuel burns to produce a high-temperature, high-pressure combustion gas. The combustion gas flows together with the steam into the turbine 4.

A steam flowmeter FS3, i.e., a steam flow measuring means, is placed in the output enhancing steam supply line 29 to measure the flow of the output enhancing steam supplied to the combustor 3. A pressure sensor (pressure measuring means) 51 for measuring pressure in the rotor chamber 42 is disposed in the rotor chamber 42. A steam injection nozzle 52 connected to the extremity of the $NO_x$ reducing steam supply line 28 is disposed near the fuel injection nozzle 49 so as to inject steam into the combustion chamber 3. Steam injected through a nozzle hole formed in the extremity of the steam injection nozzle 52 into the combustion chamber 48 reduces combustion temperature in the combustion chamber 48 to reduce $NO_x$. A steam flowmeter FS4 is placed in the $NO_x$ reducing steam supply line 28.

Figure 4:
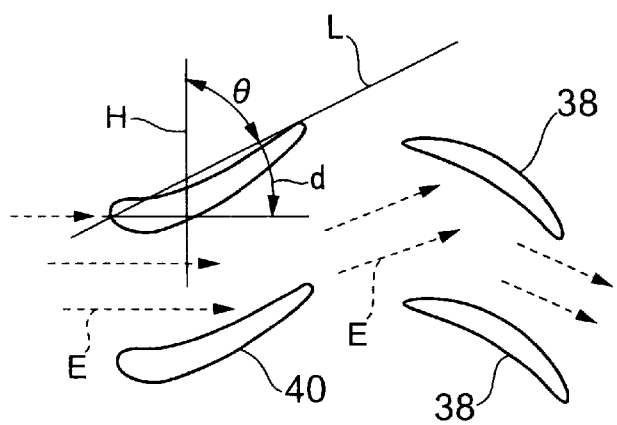
FIG. 4 is a sectional view of stationary blades included in a compressor.

An air adjusting mechanism 53 is combined with the compressor 2 to adjust the flow of air supplied to the compressor 2. As shown in FIG. 4, the air adjusting mechanism 53 adjusts the setting angle $\theta$ of the stationary blades 40 in a section of the compressor 2 to adjust the flow of air flowing into the compressor 2. The setting angle $\theta$ is equal to an angle between a line H parallel to a direction in which the stationary blades 40 are arranged and the cord line of the stationary blade 40. An angle between a direction in which air E flows and the chord line L is exit angle $\alpha$. When the setting angle $\theta$ is decreased to increase the exit angle $\alpha$, the axial velocity of air decreases and, consequently, the flow of air flowing into the compressor 2 decreases.

Figure 3:
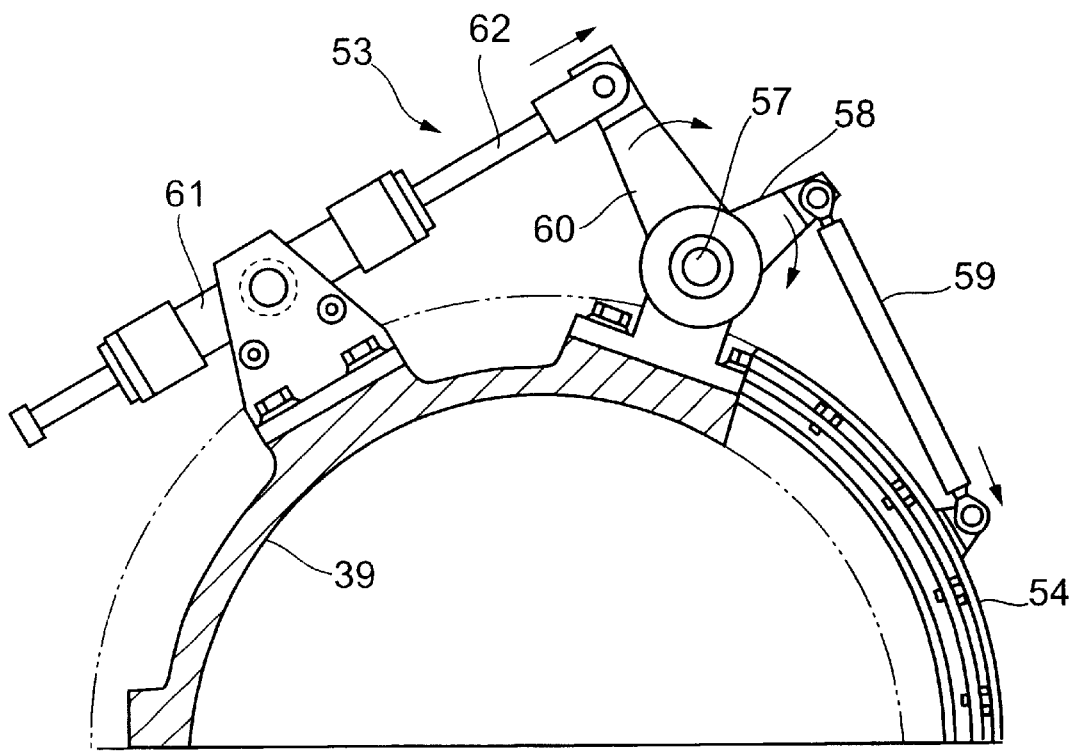
FIG. 3 is an enlarged sectional view of an air adjusting mechanism taken on line III—III in FIG. 2.

The air adjusting mechanism 53 shown in FIG. 2 adjusts the setting angle $\theta$ of the first to the fourth stationary blade 40 of the compressor 2. FIG. 3 is an enlarged sectional view of the air adjusting mechanism 53 taken on line III—III in FIG. 2. The air adjusting mechanism 53 will be described with reference to FIGS. 2 and 3. The stationary blades 40 arranged on a circle on the housing 39 form one stage. The stationary blades 40 are arranged in four stages. The air adjusting mechanism 53 adjusts the setting angle $\theta$ of the stationary blades 40 of the four stages simultaneously. Rotating rings 54 are put on the housing 39 for turning at positions near the stages of the stationary blades 40, respectively, on the housing 39. The stationary blades 40 of the stages are connected to the rotating rings 54 corresponding to the stages. The rotating rings 54 are turned to the setting angle θ of the stationary blades 40.

The rotating rings 54 for the stages are interlocked for simultaneous turning. As shown in FIG. 2, shafts 57 are extended in parallel to the axis of the compressor 2 on the outer side of the rotating rings 54. The opposite ends of the shafts 57 are supported rotatably on the housing 39. Four operating levers 58 are fixedly mounted on each shaft 47 so as to correspond to the rotating rings 54, respectively. The operating levers 58 and the rotating rings 54 are connected by turnbuckles 59, respectively. Each turnbuckle 59 has one end rotatably connected to the free end of the operating lever 58 and the other end rotatably connected to the rotating ring 54. A driving lever 60 is fixed to each shaft 57. A hydraulic cylinder actuator 61 having a piston rod 62 is fixedly held on the outer surface of the housing 39 and the free end of the piston rod 62 is connected rotatably to the free end of the driving lever 60.

When the hydraulic cylinder actuator 61 of the air adjusting mechanism 53 is actuated to project the piston rod 62 in the direction of the arrow shown in FIG. 3, the driving lever 60 is turned in the direction of the arrow (clockwise) to turn the shaft 57 in the direction of the arrow (clockwise). Consequently, the operating levers 58 fixed to the shaft 57 turn in the direction of the arrow and push the corresponding rotating rings 54 for turning. Thus, the stationary blades 40 connected to the rotating rings 54 are turned simultaneously to adjust the setting angle θ (FIG. 4) and the exit angle α is changed.

As shown in FIG. 2, the two air adjusting mechanisms 53 shown in FIG. 3 are disposed diametrically opposite to each other on the compressor 2 to turn the rotating rings 54 smoothly. The stationary blades 40 of each stage connected to the one rotating ring 54 are set at the same setting angle θ. Each of the hydraulic cylinder actuators 61 of the air adjusting mechanisms 53 is controlled in the following manner. An actuator controller (actuator control means), not shown, for controlling the hydraulic cylinder actuators 61 receive flow data on the supply rates at which steam is injected into the combustor 3 measured by the steam flowmeters FS3 and FS4 or pressure data on the pressure in the rotor chamber 42 measured by the pressure sensor 51, executes calculations using either the steam data or the pressure data, and predetermined data according to a program to calculate control data, and controls the operation of the hydraulic cylinder actuators 61 on the basis of the control data.

A description will be made of a method of controlling the air adjusting mechanisms 53 shown in FIG. 2 to adjust air flow on the basis of the steam data on the flow of steam injected into the combustor 3. The steam flow increases from zero upward and the steam flowmeters FS3 and FS4 measure the flows of steam through the steam injection nozzles 44 and 52. The flowmeters FS3 and FS4 send data on measured flows of steam to the controller. The controller executes calculations using the steam data and the predetermined data to calculate control data necessary for stabilizing a predetermined operating condition, and controls the he hydraulic cylinder actuators 61 on the basis of the control data. The air adjusting mechanisms 53 decrease the setting angle θ of the stationary blades 40 in proportion to the increase of the steam injection rate. Since the air supply rate at which air is supplied to the compressor 2 is decreased according to the increase of the steam injection rate, the flow of the mixture of air and steam remains constant. That is, even if the steam injection rate at which steam is injected into the combustion chamber 48 varies, the compressor 2 operates in an operating condition in a range defined by a predetermined characteristic curve, the reduction of the adiabatic efficiency of the compressor 2 is about 1% at the maximum and the compressor 2 operates at a comparatively high efficiency. When the stem injection rate is zero, the adiabatic efficiency of the compressor 2 is exactly the same as that of the compressor of an ordinary gas turbine.

The air adjusting mechanisms 53 are controlled by a control method substantially similar to the foregoing control method when adjusting air flow by the air adjusting mechanisms 53 on the basis of the pressure in the rotor chamber 42. The controller calculates necessary control data by using pressure data on the pressure in the rotor chamber 42 provided by the pressure sensor 51 (FIG. 2) and a set data and controls the hydraulic cylinder actuators 61 of the air adjusting mechanisms 53 on the basis of the control data. The air adjusting mechanisms 53 adjusts the setting angle θ of the stationary blades 40 to adjust the flow of air sucked into the compressor 2 such that the pressure in the rotor chamber 42 meets a predetermined pressure ratio. Flow of air into the compressor 2 is decreased according to the increase of the flow of injected steam so that the sum of the flow of air and that of steam remains constant, so that the flow of the combustion gas that flows into the turbine 4 is substantially constant.

A description will be made of an operation to cool the stationary blades 40 of the turbine 4 by steam or high-pressure air supplied through the steam/air selector valve unit 33.

Figure 5:
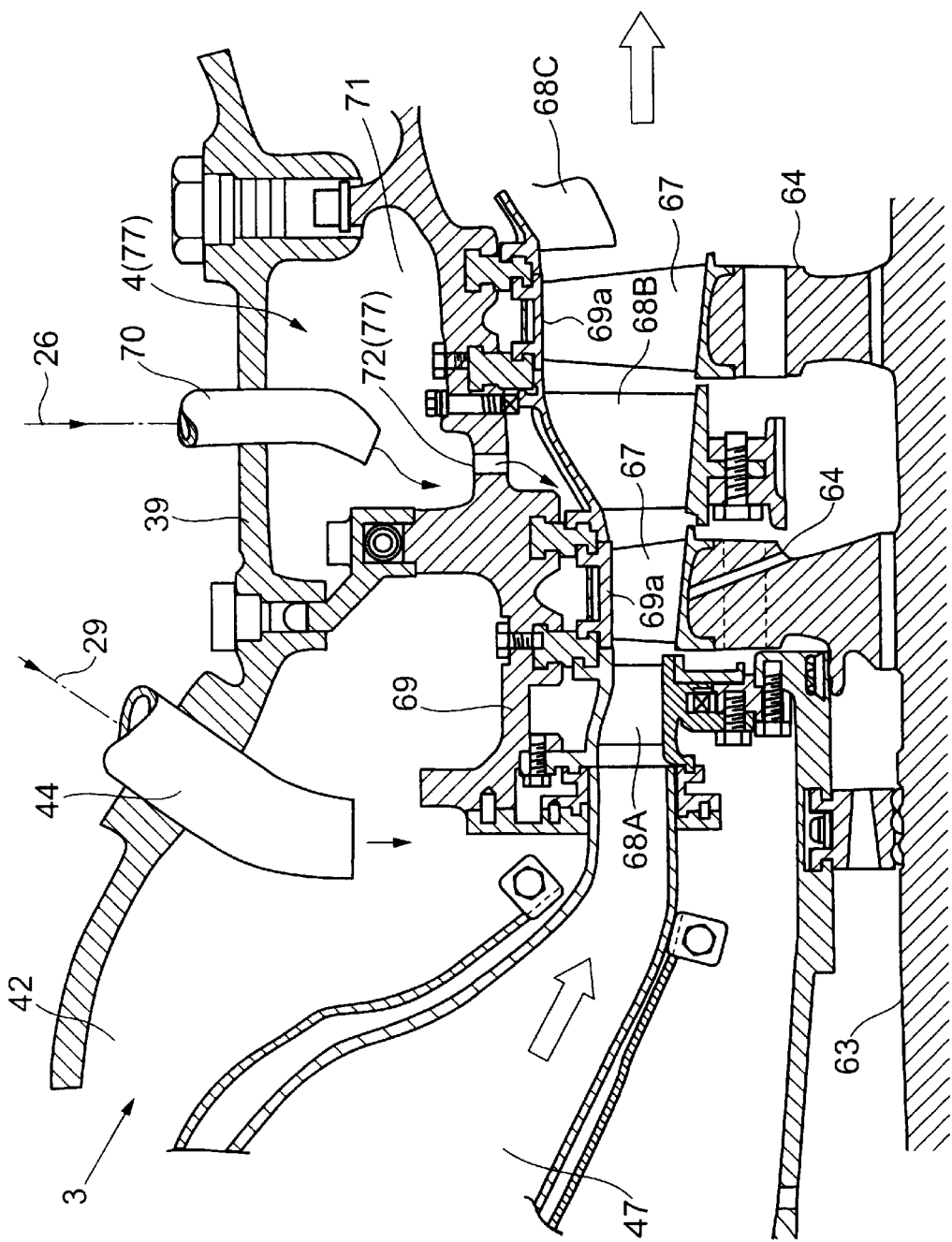
FIG. 5 is an enlarged, fragmentary longitudinal sectional view of a turbine.

FIG. 5 is an enlarged, fragmentary longitudinal sectional view of the turbine 4 included in the gas turbine 1. A turbine rotor 62 is fixedly mounted on a rotor shaft 63 and a plurality of rotor blades 67 are fixedly set on the turbine rotor 64. Nozzle blades 68A, 68B and 68C, i.e., stationary blades, are disposed on the upper side of the rotor blades 67, respectively, and are fixed to a turbine casing 69 surrounding the nozzle blades 68A to 68C and the rotor blades 67. A main housing 39 surrounds the turbine casing 69. A steam supply nozzle 70 is extended through a part of the main housing 39 corresponding to the second-stage nozzle blade 68B. Steam supplied through the cooling medium supply line 26 and jetted through the steam supply nozzle 70 into a large, annular space 71 between the main housing 39 and the turbine casing 69 flows through an inlet opening 72 toward the second-stage nozzle blade 68B. The annular space 71 and the inlet opening 72 are part of an internal steam passage 77 inside the main housing 39. The turbine casing 69 is cooled by steam flowing through the annular space 71 of the internal steam passage 77. High-pressure air extracted from the compressor 2 is supplied to the first-stage nozzle blade 68A.

As shown in FIG. 2, an air supply line 73 has one end connected to the compressor 2 and the other end connected to the cooling medium supply line 26. The steam/air selector valve unit 33 includes a check valve 33A placed in the air supply line 73, and three check valves 33B, 33C and 33D placed respectively in three steam supply branch lines 74, 75 and 76 connected to the cooling steam supply line 25. The use of the three check valves 33B to 33D provides an advantage in reducing resistance against the flow of steam.

The three check valves 33B to 33D of the steam/air selector valve unit 33 open when the pressure of steam supplied through the cooling steam supply line 25 is higher than the pressure of high-pressure air supplied through the air supply line 73 to supply steam through the cooling medium supply line 26, and the steam supply nozzle 70, the annular space 71 and the inlet opening 72 of the turbine 4 (FIG. 5) to the second-stage nozzle blade 68B. In this state, the check valve 33A is kept closed by the pressure of the steam in the cooling medium supply line 26 to prevent the flow of high-pressure air into the cooling medium supply line 26. When the amount of steam that flows into the cooling steam supply line 25 decreases and the pressure of steam in the cooling steam supply line 25 drops below the pressure of high-pressure air, the check valve 33A opens to supply high-pressure air through the cooling medium supply line 26 to the second-stage nozzle blade 68B. In this state, the check valves 33B to 33D are kept closed by the pressure of high-pressure air to prevent the flow of high-pressure air into the steam supply branch lines 74 to 76.

When surplus steam is available after supplying steam to the combustor 3, the second-stage nozzle 68B of the turbine 4 can be cooled with steam. When surplus steam decreases or any surplus steam is not available, the second-stage nozzle blade 68B can be cooled with high-pressure air. The second-stage nozzle blade 68B is cooled with steam because it is possible that thermal load on the turbine 4 increases excessively if stem is supplied to the first-stage nozzle blade 68A.

However, it is possible to supply steam to the first-stage nozzle blade 68A when a thermometer and a pressure sensor measure the temperature and pressure of steam, respectively, and the temperature and pressure of steam is adjusted properly. When steam is supplied to the first-stage nozzle blade 68A, steam energy recovery percentage at which the energy of steam is converted into the power of the turbine 4 is very large (approximately 100%) as compared with steam energy recovery percentage at which the energy of steam can be converted into the power of the turbine 4 when steam is supplied to the second-stage nozzle blade 68B. Steam energy recovery percentage is comparatively large, such as about 75%, even when steam is supplied to the second-stage nozzle blade 68B when the second stage is a higher stage in the turbine 4.

Figure 6:
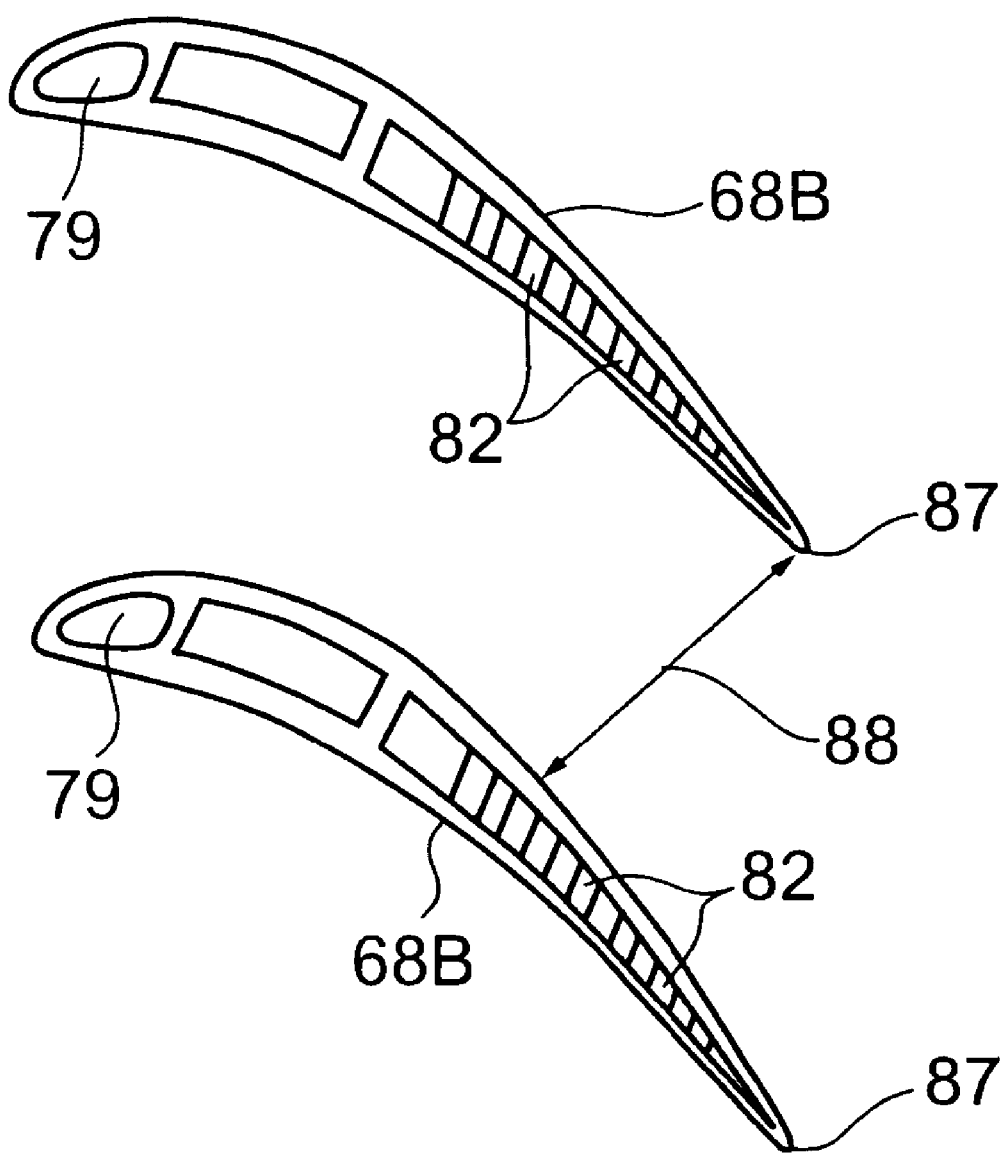
FIG. 6 is a sectional view of stationary blades included in the turbine.
Figure 7:
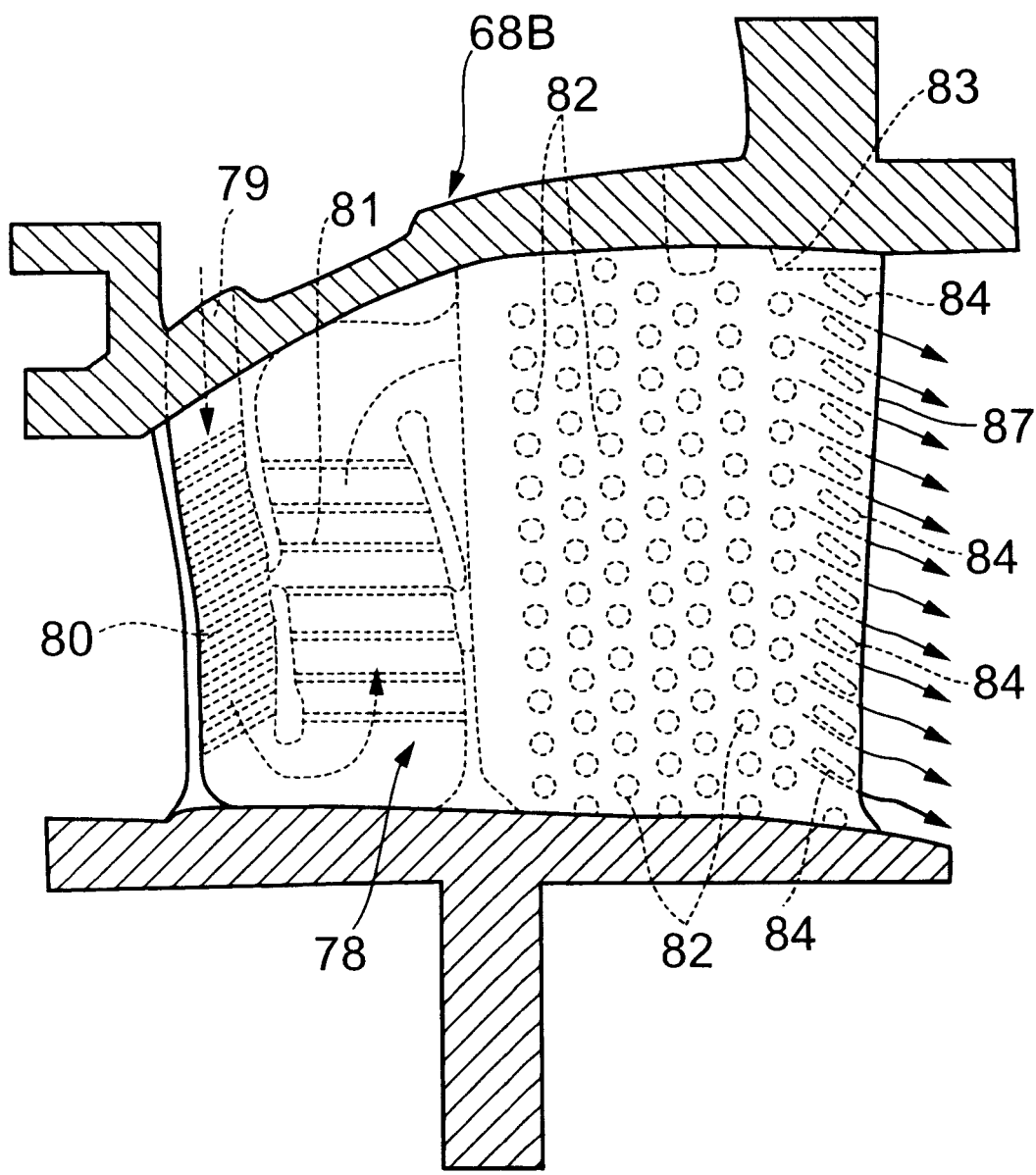
FIG. 7 is a longitudinal sectional view of the stationary blade shown in FIG. 6.

FIG. 6 is a sectional view of the cascade of second-stage nozzle blades 68B and FIG. 7 is a longitudinal sectional view of the second-stage nozzle blade 68B. The second-stage nozzle blade 68B is provided with an internal cooling passage 78 for steam supplied thereto. Referring to FIG. 7, steam flows through a steam inlet 79 formed in the leading edge of the second-stage nozzle blade 68B into the cooling passage 78, flows through spaces between first fins 80 toward second fins 81, flows pin-fin chamber 83 provided with a plurality of pin fins 82, flows through spaces between a plurality of guides 84, leaves the trailing edge 87 of the second-stage nozzle blade 68B and flows into the main gas flow in the turbine 4. Since steam cools the nozzle blade 68B while the same flows through the internal cooling passage 78 of the nozzle blade 68B, the efficiency of steam is improved. Steam passed through the internal cooling passage 78 of the nozzle blade 68B jets out from the trailing edge 87 of the nozzle blade 68B into the main gas flow, so that the output efficiency of the gas turbine 1 can be maintained on a high level.

Steam passed through the internal cooling passage 78 of the second-stage nozzle blade 68B jets out from the trailing edge 87 into the main gas flow and does not flow into the combustor 3. Thus,the compressor 2 and the turbine 4 can be easily matched, the reduction of efficiency of the compressor 2 is very small and the reduction of efficiency due to the mismatching of the compressor 2 and the turbine 4 does not occur even if there is no surplus steam that can be supplied to the turbine 4. Steam supplied to the turbine 4 flows through the second-stage nozzle blade 68B and jets out from the trailing edge 87 of the second-stage nozzle blade 68B. Thus steam does not flow through a throat 88 between the adjacent second-stage nozzle blades 68B and hence the flow of the gas into the turbine 4 changes only slightly.

The turbine casing 69 can be cooled by steam supplied through the steam supply nozzle 70 (FIG. 5) into the annular space 71 between the main housing 39 and the turbine casing 69. For example, when saturated steam is injected through the steam supply nozzle 70 into the annular space 71, the turbine casing 69 is cooled effectively, the tip clearance between the tip of the rotor blade 67 and the inner surface 69a of the turbine casing 69 is small, so that the leakage loss of the combustion gas is small, the adiabatic efficiency of the turbine 4 is improved and the thermal efficiency of the gas turbine is improved. Measured values representing the dependence of the thermal efficiency of the turbine 4 on the rate of injection of steam into the turbine 4 are shown in FIG. 8. In FIG. 8, a curve Q1 indicates the variation of increment of thermal efficiency relative to a thermal efficiency when any steam is not injected at all into the turbine 4 with steam injection rate at which steam is injected into the main gas flow in the turbine 4. The curve Q1 shows the combined effect of the injection of steam into the main gas flow in the turbine 4 and the reduction of the tip clearance on the improvement of thermal efficiency. A curve Q indicates the theoretically calculated increment of thermal efficiency dependent on the injection of steam into the main gas flow. The difference between the curves Q1 and Q corresponds to the increment of thermal efficiency owing to the reduction of the tip clearance.

The tip clearance is formed properly so that the rotor blades 67 of the turbine 4 may not come into contact with the inner surface 69a of the turbine casing 69 in a state soon after the start of the gas turbine 1 where the rotor blades 67 are exposed to the combustion gas and are caused to expand by the heat of the combustion gas whereas the turbine casing 69 has not been heated yet and has not expanded yet. If the turbine casing 69 is not cooled, the turbine casing 69 is heated at a high temperature and the tip clearance increases. Cooling the turbine casing 69 with steam suppresses the thermal expansion of the turbine casing 69 and hence the increase of the tip clearance is suppressed. As shown in FIG. 8, the tip clearance when steam was supplied at 5 t/h was smaller by 70% than that in the corresponding conventional gas turbine.

An optimum tip clearance can be formed between the tips of the rotor blade 67 and the inner surface 69s of the turbine casing of the turbine 4 according to operating condition by controlling the temperature of steam to be supplied to the turbine 4.

Steam may be supplied to the first-stage nozzle blades 68A instead of to the second-stage nozzle blades 68B. When steam is supplied to the first-stage nozzle blades 68A, the steam flows through the internal cooling passages of the first-stage nozzle blades 68A, jets out from the trailing edges of the first-stage nozzle blades 68A and does not flow through throats between the adjacent first-stage nozzle blades 68A. Although the steam jetted from the trailing edges of the first-stage nozzle blades 68A flows through the throats between the adjacent second-stage nozzle blades 68B, the steam does not affect the flow of the combustion gas into the turbine 4 because the flow of the combustion gas is dependent on the sectional area of the throats formed by the first-stage nozzle blades 68A.

The steam used for cooling may flow into the main gas flow in a section between the combustion chamber 48 and the turbine 4 instead of into the main gas flow in the turbine 4. The thermal energy of steam can be recovered and the overall thermal efficiency of the gas turbine can be improved also when the steam flows into the main gas flow in the section between the combustion chamber 48 and the turbine 4.

Table 1 shows modes of control of the distribution valve 27 by the controller 32 shown in FIG. 1.

TABLE 1

| | | | | | | | |
|---|---|---|---|---|---|---|---|
| Total flow of steam excluding process steam (t/h) | 0–2 | 3 | 4 | ... | 7 | 8 | 8–12 |
| Flow of steam for NO$_x$ reduction (t/h) | 0–2 | 2 | 1.5 | ... | 0.5 | 0 | 0 |
| Flow of steam for output enhancement (t/h) | 0 | 1 | 2.5 | ... | 6.5 | 8 | 8 |
| Flow of steam for nozzle blade cooling (t/h) | 0 | 0 | 0 | ... | 0 | 0 | 0–4 |

A necessary amount of process steam in the steam supplied from the superheater 19 (FIG. 1) to the steam supply system 23 is supplied preferentially to the external steam loads 22 and the rest of the steam flows into the steam supply line 24. The steam flowmeter FS1 measures the flow (t/h)of the steam flowing through the steam supply line 24. The controller 32 always monitors data provided by the steam flowmeter FS1 and controls the opening of a flow adjusting valve 36 on the bases of the data provided by the steam flowmeter SF1 such that the steam is supplied to the distribution valve 27 at a flow below an upper limit flow of 8 t/h at which incomplete combustion does not occur in the combustor 3. If the total steam flow is less than 3 t/h, the controller 32 controls the distribution valve 27 so that a large part of the steam is used for NOx reduction. If the total steam flow is in the range of 4 to 8 t/h, the controller 32 controls the distribution valve 27 so that a large part of the steam is used for output enhancement.

When the total steam flow is 8 t/h, all the steam is used for output enhancement because the steam used for output enhancement can reduce NOx. If the total steam flow is less than 8 t/h, any steam is not used for cooling the nozzle blades of the turbine 4 and high-pressure air is sued for cooling the second-stage nozzle blades 68B (FIG. 5). If the steam flow rate of the steam supplied into the steam supply line 24 is higher than 8 t/h, the flow adjusting valve 36 permits the steam to flow into the distribution valve 27 at 8 t/h and the rest of the steam is supplied through the steam/air selector valve unit 33 to the second-stage nozzle blades 68B (FIG. 5).

As apparent from the foregoing description, in the steam-injection type gas turbine system according to the present invention, a necessary amount of the steam generated by the waste-heat boiler using the exhaust gas discharged from the turbine is supplied preferentially to the external steam loads, the steam is supplied at a flow that will not cause incomplete combustion in the combustor and the rest of the steam is used for cooling the stationary blades. Thus, all the generated steam is used effectively and compressed air is not used always for cooling the stationary blades of the turbine, so that the overall thermal efficiency of the gas turbine can be maintained on a high level. Since the steam used for cooling the stationary blades of the turbine is not injected into the combustor, incomplete combustion due to the excessive supply of steam to the combustor does not occur.

What is claimed is:

1. A steam-injection type gas turbine system, comprising:
   an air compressor for compressing air;
   a combustor for mixing a fuel with compressed air to burn the fuel;
   a turbine driven by energy of a combustion gas produced by the combustor;
   a waste-heat boiler using an exhaust gas discharged from the turbine as a heat source;
   a steam supply system for distributing steam generated by the waste-heat boiler to the combustor, stationary blades of the turbine and external steam loads; and
   a steam distribution adjusting means for firstly supplying the steam to the external steam loads, and secondly supplying, when steam is left, the rest of the steam to the combustor with adjustment of the rate of supply of steam to the combustor and supplying the rest of the steam to the stationary blades so that the steam leaving the stationary blades is mixed in a main gas flow below the combustor.

2. The steam-injection type gas turbine system according to claim 1, wherein each of the stationary blades of the turbine is provided with a cooling passage, and steam supplied to the stationary blades flow through the cooling passages of the stationary blades and flow from trailing edges of the stationary blades into the main gas flow.

3. The steam-injection type gas turbine system according to claim 1, wherein the stationary blades of the turbine to which steam is supplied are those forming first-stage or second-stage nozzle blades.

4. The steam-injection type gas turbine system according to claim 1 further comprising:
   an air supply means that extracts high-pressure air from the compressor and supplies the same to the stationary blades of the turbine; and
   a steam/air selecting means that supplies the high-pressure air to the stationary blades when the rate of supply of steam to the stationary blades decreases.

5. The steam-injection type gas turbine system according to claim 1, an internal steam passage through which steam is supplied to the stationary blades of the turbine is formed by a turbine casing surrounding the stationary blades and the rotor blades of the turbine, and a main housing surrounding the turbine casing, and the turbine casing is cooled by steam that flows through the internal steam passage.

6. The steam-injection type gas turbine system according to claim 1, wherein the steam supply system includes
   a NO$_x$ reducing steam jetting nozzle for reducing the NO$_x$ by injecting the steam into the combustor so as to reduce a combustion temperature and
   an output enhancing steam jetting nozzle placed in the combustor.

7. The steam-injection type gas turbine system according to claim 1, further comprising:
   air adjusting mechanisms for adjusting air flow at which air flows into the compressor by adjusting the setting angle of the stationary blades of the compressor; and
   an air control means for controlling the air adjusting mechanisms to decrease air flow according to an increase in steam flow at which steam is supplied to the combustor.

8. The steam-injection type gas turbine system according to claim 1,
   wherein the steam distribution adjusting means supplies firstly the rest of the steam, when the steam is left, to the combustor and secondly the rest of the steam, when the steam is further left, to the stationary blades.

9. The steam-injection type gas turbine system according to claim 1,
   wherein the steam distribution adjusting means supplies firstly the rest of the steam, when the steam is left, to the stationary blades and secondly the rest of the steam, when the steam is further left, to the combustor.

* * * * *